United States Patent
Johnson, Jr. et al.

(10) Patent No.: US 6,346,909 B1
(45) Date of Patent: Feb. 12, 2002

(54) SYSTEM FOR GENERATING SIMULATED RADAR TARGETS

(75) Inventors: James B. Johnson, Jr., Hampton Cove; Michael P. Connolly, Elkmont, both of AL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/656,194

(22) Filed: Sep. 6, 2000

(51) Int. Cl.[7] ................................................. G01S 7/40
(52) U.S. Cl. ........................ 342/169; 342/170; 342/171; 342/172; 342/167; 434/2
(58) Field of Search ................................. 342/165, 167, 342/169, 170, 171, 172, 173, 174; 434/2

(56) References Cited

U.S. PATENT DOCUMENTS

| | | | | |
|---|---|---|---|---|
| 4,192,082 A | * | 3/1980 | Deaton et al. | 434/2 |
| 4,342,514 A | * | 8/1982 | Mathews | 356/4.02 |
| 4,406,627 A | * | 9/1983 | Winthrop et al. | 434/219 |
| 4,454,513 A | * | 6/1984 | Russell | 342/174 |
| 4,625,209 A | * | 11/1986 | Lawrence et al. | 342/169 |
| 4,666,407 A | * | 5/1987 | Jones | 434/2 |
| 4,672,438 A | * | 6/1987 | Plante et al. | 348/121 |
| 4,679,049 A | * | 7/1987 | Riffiod | 342/172 |
| 4,903,029 A | * | 2/1990 | Newberg et al. | 342/172 |
| 4,982,196 A | * | 1/1991 | Thomas et al. | 342/172 |
| 5,047,782 A | * | 9/1991 | Lew et al. | 342/169 |
| 5,133,663 A | * | 7/1992 | Willingham et al. | 434/2 |
| 5,138,325 A | * | 8/1992 | Koury | 342/169 |
| 5,150,127 A | * | 9/1992 | Aw | 342/169 |
| 5,160,264 A | * | 11/1992 | Banura et al. | 434/2 |
| 5,177,488 A | * | 1/1993 | Wang et al. | 342/167 |
| 5,223,840 A | * | 6/1993 | Cronyn | 342/170 |
| 5,247,843 A | * | 9/1993 | Bryan | 73/865.6 |
| 5,262,786 A | * | 11/1993 | Cross | 342/167 |
| 5,262,787 A | * | 11/1993 | Wilson et al. | 342/173 |
| 5,442,360 A | * | 8/1995 | Maignan et al. | 342/120 |
| 5,493,304 A | * | 2/1996 | Lee et al. | 342/360 |
| 5,518,400 A | * | 5/1996 | Otoide et al. | 434/4 |
| 5,828,943 A | * | 10/1998 | Brown | 434/258 |
| 5,870,055 A | * | 2/1999 | Kim | 342/169 |
| 5,940,801 A | * | 8/1999 | Brown | 705/2 |
| H1806 H | * | 10/1999 | Ammons et al. | 342/165 |
| 6,087,995 A | * | 7/2000 | Grace et al. | 343/703 |

* cited by examiner

*Primary Examiner*—John B. Sotomayor
(74) *Attorney, Agent, or Firm*—Arthur H. Tischer; Freddie M. Bush; Hay Kyung Chang

(57) ABSTRACT

A system is disclosed for generating simulated radar targets that eliminates the necessity for large outdoor test ranges and is relatively low in cost. The simulated radar target generating system provides complex targets of given simulated dimensions at given simulated distances when stimulated by signals emitted by the radar sensor in the sensor's operational frequency. The dimensions are simulated by the use of multi-tap delay device while the distances (or, range) are simulated by routing the signal, in the form of light, through a fiber optic delay of a desired length. This system, which costs less than $50 thousand, can be located as close as eight feet to the sensor under test.

16 Claims, 1 Drawing Sheet

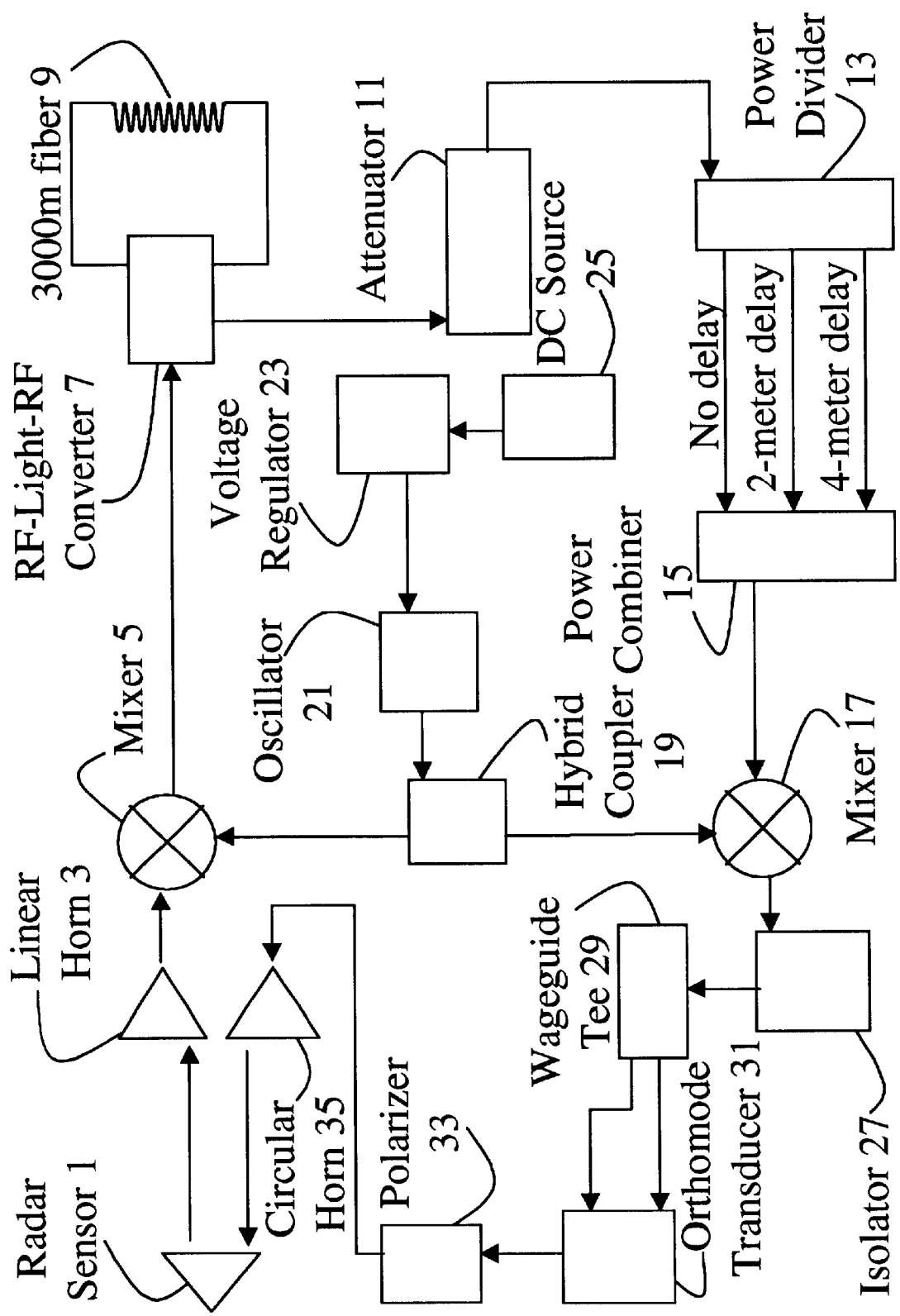

US 6,346,909 B1

SYSTEM FOR GENERATING SIMULATED RADAR TARGETS

DEDICATORY CLAUSE

The invention described herein may be manufactured, used and licensed by or for the Government for governmental purposes without the payment to us of any royalties.

BACKGROUND OF THE INVENTION

There are two typical methods of testing a Ka band millimeter wave (MMW) radar sensor. One is to set up a far-field outdoor test with actual targets or use corner reflector arrays that simulate targets of a certain size at a certain distance from the radar sensor. This method requires a great deal of space and is consequently unsuitable for use inside laboratories or production plants.

An alternative method is to place the radar sensor in a hardware-in-the-loop simulator facility which provides dynamic target ranging and a variety of target signatures. However, this method is prohibitive in cost; therefore, also unsuitable for use in many laboratories and production plants.

SUMMARY OF THE INVENTION

Disclosed herein is a system for generating simulated radar targets that eliminates the necessity for large outdoor test ranges and is relatively low in cost. The simulated radar target generating system provides complex targets of given simulated dimensions at given simulated distances when stimulated by signals emitted by the radar sensor in the sensor's operational frequency. The dimensions are simulated by the use of multi-tap delay device while the distances (or, range) are simulated by routing the signal (in the form of light) through a fiber optic delay of a desired length.

DESCRIPTION OF THE DRAWING

The single figure is a diagram of a preferred embodiment of the System for Generating Simulated Radar Targets.

DESCRIPTION OF THE PREFERRED EMBODIMENT

Referring now to the drawing wherein like numbers represent like parts and arrowheads indicate the direction of signal travel, the structure and operation of the System for Generating Simulated Radar Targets (hereinafter referred to as the "Generating System") is explained in detail. Even though the usefulness of the Generating System is not limited to testing Ka band MMW missile radar sensors, such a sensor is used for demonstrative purposes in the description of the Generating System's function.

Ka band MMW missile radar sensor 1 emits radiation (Input) toward linear horn 3 which, being operational within the operational frequency range of the sensor emission, receives the Input and further transmits the Input to first mixer 5. Therein, the Input is mixed with a portion of predetermined frequency signal, such as a 32 GHz signal, generated by oscillator 21 and forwarded to the first mixer via hybrid coupler 19. The result of this mixture is intermediate frequency (IF) signal, Input-32 GHz, or about 3 GHz. This IF signal is received by radio frequency-to-light-to-radio frequency converter 7 which initially converts the IF signal to light and sends the light to be routed through optical fiber spool 9 of a pre-chosen length. This is to simulate a pre-selected distance. For example, using a 3000-meter fiber spool simulates a target that is 1500 meters away from the radar sensor under test. When the light re-enters converter 7, after being routed the length of optical fiber spool 9, it is re-converted to IF signal before exiting the converter. The exiting signal is Input-32 GHz but now delayed by the length of the optical fiber spool.

The exited signal travels through fixed dB attenuator 11 to achieve the simulation of a desired power level prior to entering power divider 13. The delayed Input-32 GHz is split by the power divider into as many taps as there are coaxial cables between power divider 13 and power combiner 15. One tap is passed from the power divider to the power combiner with essentially no delay while another tap is passed with a given delay. Yet another tap can be passed with greater delay. Such delayed passages together achieve the effect of simulating a given size of a target in the pre-selected distance range. In the case of a simulated target of a typical tank, the given delay is about 2 meters while the greater delay is about 4 meters. The multiple taps are then combined by power combiner 15, resulting in Input-32 GHz that has been coarsely delayed by the optical fiber spool and then finely spread in time by the tapped delays. This time-spread Input-32 GHz is then mixed at second mixer 17 with another portion of the pre-determined frequency (in this case, 32 GHz ) signal generated by oscillator 21 and forwarded by hybrid coupler 19, utilizing a single oscillator for both mixers 5 and 17. The resulting Ka band signal is subsequently passed through at least one 50 dB isolator 27 to minimize possible damage that may be caused by errant external signals to the target generating system. The use of two 50 dB isolators is preferred.

From the isolators, the Ka band signal travels to waveguide tee 29 which splits the signal into two portions, sending one portion to orthomode transducer 31 by one path and sending the other portion by another path. It is critical that these two paths be of unequal lengths. The output signal of the orthomode transducer has a component that is of linear vertical polarization as well as a component that is of linear horizontal polarization. Further, the output signal is within the operational frequency of radar sensor 1 that is being tested, in this case Ka band MMW. Thence, the vertically and horizontally polarized signal is input to polarizer 33 which produces therefrom a final output of left-hand circular and right-hand circular polarizations, simultaneously. This final output is radiated toward the radar sensor via circular horn 35 to be used to test the capabilities of the radar sensor.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. A system for generating simulated radar targets of pre-selected dimensions at pre-selected simulated distances for testing a radar sensor, the radar sensor having an operational frequency range, said radar target generator comprising: a source of input radiation in the radar sensor's operational frequency range; a means for receiving said input radiation and, in response, producing intermediate frequency signal; a means for simulating said pre-selected dimensions; a means for simulating said pre-selected distances, said distance-simulating means being coupled between said intermediate-frequency producing means and said dimension simulating means; a means for rendering said intermediate frequency into an output in the radar sensor's operational frequency; and a means for transmitting said output to the radar sensor to be used in testing the radar sensor, said rendering means being connected between said dimension-simulating means and said transmitting means.

2. A system for generating simulated radar targets of pre-selected dimensions at pre-selected simulated distances for testing a radar sensor as set forth in claim 1, wherein said intermediate frequency signal is Input radiation-32 GHz.

3. A system for generating simulated radar targets as set forth in claim 2, wherein said means for producing intermediate frequency signal comprises a first mixer coupled between said input radiation source and said distance-simulating means; an oscillator for generating a predetermined frequency signal, said first mixer receiving and mixing said pre-determined frequency signal with said input radiation to produce said intermediate frequency signal prior to sending said intermediate frequency signal to said distance-simulating means.

4. A system for generating simulated radar targets as set forth in claim 3, wherein said distance-simulating means comprises a radio frequency-to-light-to-radio frequency converter positioned to receive said intermediate frequency signal from said first mixer and convert said signal to light; and an optical fiber of pre-chosen length, both ends of said fiber being connected to said converter such that said light departs said converter and enters said fiber at one end, travels the length of said fiber, thereby achieving simulated distance, and re-enters said converter through the other end of said fiber, said converter re-converting said light to intermediate frequency signal.

5. A radar target simulator as set forth in claim 4, wherein said means for rendering said intermediate frequency into an output in the radar sensor's operational frequency comprises a second mixer for mixing input signals; a hybrid coupler coupled simultaneously between said first and second mixers and said oscillator, said coupler splitting said pre-determined frequency signal generated by said oscillator into two portions and forwarding one portion to said first mixer while forwarding the other portion to said second mixer; an orthomode transducer; a waveguide tee coupled to said second mixer to receive signals therefrom, said waveguide tee separating any received signal into a first part and a second part, said waveguide tee being further coupled to said orthomode transducer via a first path and a second path, said paths being of unequal lengths and said waveguide tee transmitting to said orthomode transducer said first part via said first path and said second part via said second path, said orthomode transducer producing, in response, an output signal having linear vertical polarization and linear horizontal polarization; and a polarizer coupled to receive said linearly polarized output signal from said orthomode transducer and yield a final output signal having simultaneous left-hand and right-hand circular polarizations, said final output signal being in the radar sensor's operational frequency range.

6. A radar target generating system as set forth in claim 5, wherein said dimension-simulating means comprises a power divider coupled to receive said intermediate frequency signal from said converter; a power combiner coupled to said second mixer; and a plurality of coaxial cables, said coaxial cables extending between said power divider and said power combiner and time-spreading by varying degrees said intermediate frequency signal in its travel from said power divider to said power combiner.

7. A radar target generating system as set forth in claim 6, wherein said plurality of coaxial cables is three in number.

8. A radar target generator as set forth in claim 7, wherein said transmitting means comprises a circular horn for transmitting said final output signal from said polarizer to the radar sensor.

9. A radar target generating system as set forth in claim 8, wherein said target generating system further comprises an attenuator coupled between said converter and said power divider, said attenuator imparting a pre-determined power level to said intermediate frequency signal.

10. A radar target generator as set forth in claim 9, wherein said target generator still further comprises a linear horn positioned between said input radiation source and said first mixer, said linear horn transmitting said input radiation as input frequency signal toward said first mixer.

11. A radar target generator as set forth in claim 10, wherein said target generator yet further comprises a means for supplying DC power to said oscillator.

12. A radar target generator for simulating targets of pre-selected dimensions at pre-selected distances for testing a radar sensor, the radar sensor having an operational frequency range, said target generator comprising:

a source of input radiation in the radar sensor's operational frequency range; a means for converting said input radiation to input frequency signal; a first mixer for receiving said input frequency signal and a pre-determined frequency signal and producing intermediate frequency signal therefrom; a radio frequency-to-light-to-radio frequency converter coupled to receive said intermediate frequency signal and convert said intermediate frequency signal to light; an optical fiber of pre-chosen length, said fiber being positioned to provide a path for light from said converter to travel prior to returning to said converter, thereby simulating said pre-selected distance, said converter re-converting said returned light to said intermediate frequency signal; a power divider and a power combiner with several coaxial cables connected therebetween, said cables imparting differentiated delay effects to said intermediate frequency signal, thereby simulating said pre-selected dimensions; a means for rendering said intermediate frequency into an output in the radar sensor's operational frequency; and a means for transmitting said output to the radar sensor to be used in testing the radar sensor, said rendering means being connected between said dimension-simulating means and said transmitting means.

13. A radar target generator for simulating targets of pre-selected dimensions at pre-selected distances for testing a radar sensor as described in claim 12, wherein said means for rendering said intermediate frequency into an output in the radar sensor's operational frequency comprises an oscillator for producing an input signal of a pre-determined frequency; a second mixer for mixing input signals; a hybrid coupler coupled simultaneously between said first and second mixers and said oscillator, said coupler splitting said pre-determined frequency signal generated by said oscillator into two portions and forwarding one portion to said first mixer while forwarding the other portion to said second mixer; an orthomode transducer for producing an output signal having linear vertical polarization and linear horizontal polarization; a waveguide tee for separating any incident signal into a first part and a second part, said waveguide tee being coupled to said orthomode transducer via a first path and a second path, said paths being of unequal lengths, said waveguide tee transmitting to said orthomode transducer said first part via said first path and said second part via said second path; and a polarizer coupled to receive said linearly polarized output signal from said orthomode transducer and yield a final output signal having simultaneous left-hand and right-hand circular polarizations, said final output signal being in the radar sensor's operational frequency range.

14. A radar target generator as described in claim 13, wherein said generator farther comprises at least one dB isolator coupled between said second mixer and said waveguide tee, said isolator shielding said generator from effects of any random external signals.

15. A radar target generator as described in claim 14, wherein said generator still further comprises a DC source; and a voltage regulator, said regulator being coupled between said DC source and said oscillator.

16. A radar target generator as described in claim 15, wherein said generator yet farther comprises an attenuator coupled between said converter and said power divider, said attenuator receiving said intermediate frequency signal from said converter and imparting a desired power level to said intermediate frequency signal prior to forwarding said intermediate frequency signal to said power divider.

* * * * *